United States Patent [19]

Tack

[11] 4,025,764
[45] May 24, 1977

[54] MULTI PASS MACHINING WITH CONTROL OF FEED INCREMENTS

[76] Inventor: Alfred Tack, 19 Sinfin Moor Lane, Chellaston, Derby, England

[22] Filed: Mar. 17, 1976

[21] Appl. No.: 667,873

[52] U.S. Cl. .................. 235/151.11; 90/4; 51/165.71; 82/5; 90/13 C

[51] Int. Cl.² ......................... B23F 1/00

[58] Field of Search .............. 235/151.11; 90/13 C, 90/4; 82/5; 318/571; 51/165.77, 165.71

[56] References Cited

UNITED STATES PATENTS

| | | | |
|---|---|---|---|
| 3,232,170 | 2/1966 | Findley | 90/4 |
| 3,254,566 | 6/1966 | Bradner | 90/4 |
| 3,854,353 | 12/1974 | Cutler | 82/1 C |

*Primary Examiner*—Eugene G. Botz
*Attorney, Agent, or Firm*—Robert F. O'Connell

[57] ABSTRACT

In a machine tool control system of the type wherein repeated machining passes are effected with progressively reducing increments of in-feed, each increment is stored, e.g. digitally, and is iteratively combined with a modifying constant to form the new, reduced feed increment for the next machining pass, preferably by multiplying the increment by a modifying constant less than unity.

5 Claims, 4 Drawing Figures

MULTI PASS MACHINING WITH CONTROL OF FEED INCREMENTS

The present invention relates to a control device for a machine tool which effects a machining operation in a succession of passes, in between which an increment of feed is made, either by feeding the tool towards the workpiece or vice versa. It is a common requirement to reduce the feed increments progressively, either to ensure a very fine finish or to compensate for the fact that equal feed increments would lead to progressively greater volumes of metal being removed in successive passes.

The invention is particularly suited to control relieving lathes used to relieve hobs or form mills but, it can be used also to control screw cutting and grinding lathes, and form milling and grinding machines, for example. It is known to control the feed increments of a relieving lathe by means of a suitably shaped cam controlling the movements of a slide through an electromechanical servo system. Such apparatus is complex and bulky and requires an excessive amount of maintenance.

With a view of overcoming these problems, the present invention provides a control device for a machine tool, comprising means for storing a feed increment to be used for a machining pass, means for storing a modifying constant, and means operative to compute the feed increments for a successive pass by forming a predetermined mathematical combination of the stored feed increment and the constant, and replacing the stored increment thereby.

It will be understood that the device operates iteratively through a sequence of passes. The constant can be subtracted from the increment, in which case the increments form a decreasing arithmetic progression and a plot of cummulative feed against a number of passes becomes a parabolic curve. Such a curve has a good initial shape but terminates rather abruptly as the increment goes to zero. It is, therefore, preferred to multiply the increment by the constant, which must, in this case, be less than one, so that the increments form a decreasing exponential progression and a plot of cummulative feed becomes an exponential curve.

Although the increment and constant can be stored in analog form, it is preferred to store them digitally and to provide manually adjustable means for setting in their values. The feed can be executed in accordance with the stored increment using well known techniques of numerical control.

The invention will be described in more detail, by way of example, with reference to the accompanying drawings, in which.

Figure 1:
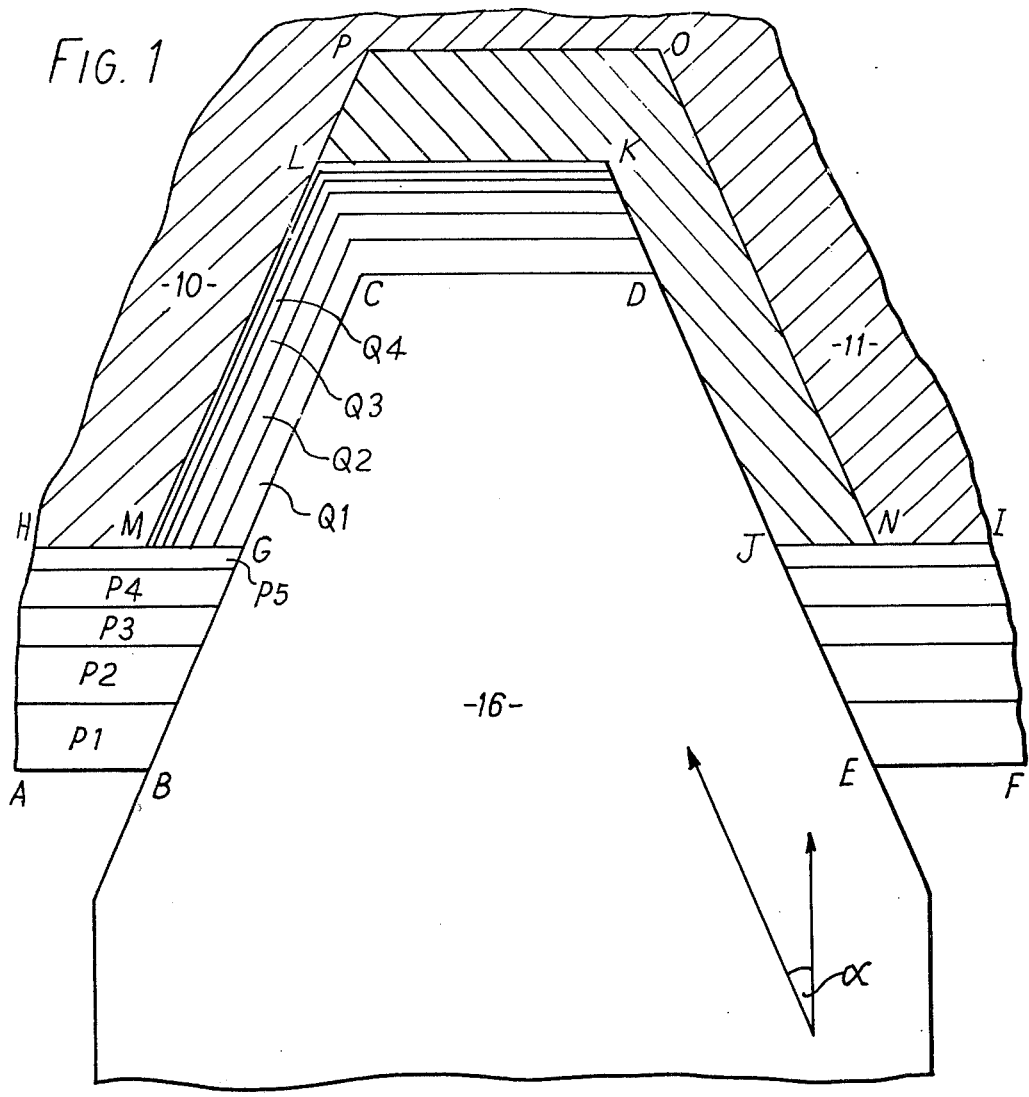
FIG. 1 illustrates the procedure of relieving a large hob.

FIG. 1 is a fragmentary cross-section in a longitudinal, axial plane of parts of two adjacent teeth 10 and 11 of a helical hob. The hob is mounted between the centres of a relieving lathe and as it is rotated, the saddle is traversed in accordance with the pitch of the helix, with automatic return, during which the X-side is retracted, taking the Z-axis as left to right between the centres and X as the horizontal axis directed perpendicularly away from the Z-axis, as shown in FIG. 1. Rectangle 12 - 15 shows the compound movement of the X-slide as follows: ;p1 12 - cutting pass 13 - retract
14 - return
15 - in-feed.

The rough tooth profile before relieving commences is shown at A, B, C, D, E, F. Initially, the tops of the teeth are relieved by removing the cross-sections A, B, G, H and E, F, I, J in passes P1 etc., during which the correspondingly labelled thickness of metal are removed by a tool carried by the X-slide. For clarity of the drawing, the thicknesses removed are greatly exaggerated. The in-feed 15 has to be incremented correspondingly prior to each cutting pass 12 and the increments have to progressively reduced, as shown at P1 to P5.

The next stage is to turn the right flank of the helix using a form tool 16 shown positioned for the commencement of this stage. During passes Q1 etc., the right flank is cut and it will be seen that a compound in-feed increment is required with increments $-\Delta Z$ and $-\Delta X$ proportioned so that $|\Delta Z/\Delta X| = \tan \alpha$, $\alpha$ being the angle shown (which will ultimately be the gear tooth pressure angle), such that the tool 16 slides without cutting on the left flank E, J, D. Again, the increments must progressively reduce. In this second stage, the area G, C, D, K, L, M is removed.

In a third stage, the area L, K, J, N, O, P is removed, relieving the left flank, with increments $+\Delta Z$ and $-\Delta X$ such that $|\Delta Z/\Delta X|$ is again $\tan \alpha$.

In all three stages, the actual relieving of each tooth is performed in a manner known per se by use of a cam operating on another X-slide to move this slide in as the tool cuts across each tooth and to retract the slide in between the teeth. X-feed gives pressure angle relief in the second and third stages because of the slope $\alpha$ of the flanks.

Figure 2:
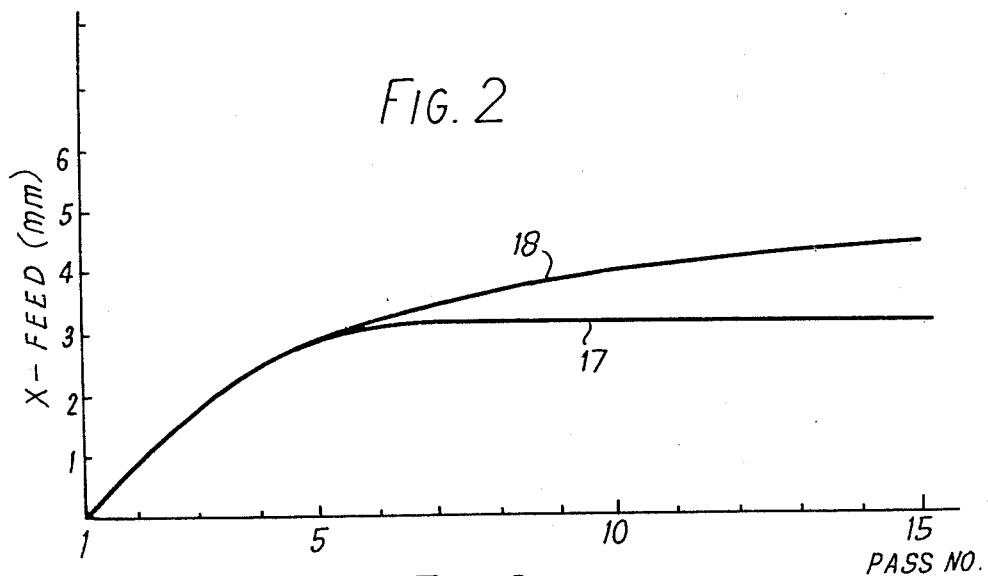
FIG. 2 is a graph of feed against machine pass.

FIG. 2 shows X-feed plotted against pass number. The ordinate is actually $-X$ as in-feed is in the $-X$ direction. The origin of the ordinate is, for convenience, taken to be the starting position of the tool, e.g. the position illustrated in FIG. 1 for the second stage. For simplicity, the starting increment is taken to be 1 mm, although this might be rather large in practice.

Curve 17 shows the situation which arises when a constant of 0.2 is subtracted from the increment at each pass. The increments are, therefore, 1.00, 0.80, 0.60, 0.40, 0.20 (an arithmetic progression) and, from the sixth pass onwards there is no increment, i.e. no further feed. Curve 17 is parabolic and the feed terminates rather abruptly. Although this may be satisfactory for some applications, it is preferred to use the exponential curve 18.

Curve 18 is created by using an initial increment of 1.00 mm and a multiplying constant of 0.8 such that the increments follow the geometric progression:

1. $1 \times 0.8$  $1 \times (0.8)1$  $\times(0.8)^3$ etc., i.e. 1.00, 0.80, 0.64, 0.51, 0.41, 0.33, 0.26, etc., whereby the cumulative feed follows the exponential course:

1.00, 1.80, 2.44, 2.95, 3.36, 3.69, 3.95, etc.

Figure 3:
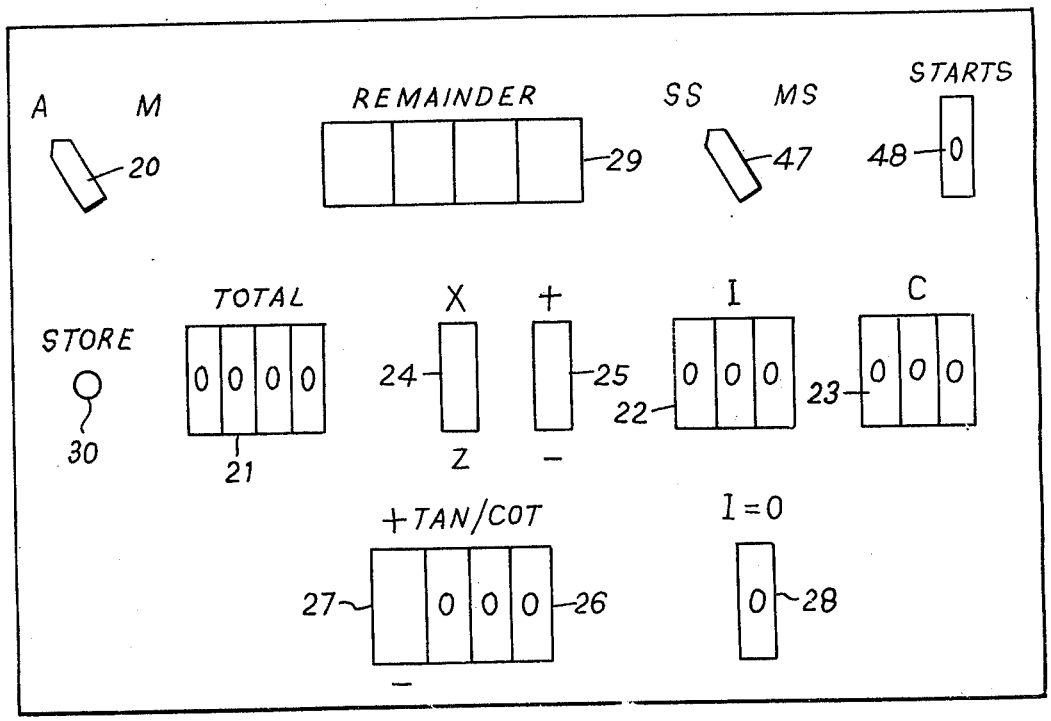
FIG. 3 shows the control panel of a device embodying the invention.

FIG. 3 shows the control panel for one embodiment of the invention. A two-position switch 20 enables either manual or automatic control of feed increment to be selected. For automatic operation, a series of rotary, decade edge switches is provided, namely, four switches 21 for setting in the required total feed, three switches 22 for setting in the initial increment and three switches 23 for setting in the constant. A rocker switch 24 determines whether the quantities pertain to the X or Z axis and a rocker switch 25 determines whether the feed for this axis is positive or negative.

Three digit switches 26 and a rocker switch 27 allow tan α or cot α and its sign to be entered when feed increments are required for both axes, as in stages two and three for FIG. 1. Another digit switch 28 can be set to give a number of "spark out" passes, without any feed, at the end of a stage. When the switches have been set, a button 30 is depressed to enter the various quantities in stores described in relation to FIG. 4.

A four digit display 29 using LED's or other known numeral display devices shows the feed remainder, which is the quantity initially set on switches 21 decremented progressively by the feed increments actually executed. When this reaches zero, the process ceases, or transfers to execute the spark-out cycles if the switch 28 has been set to other than zero.

Figure 4:
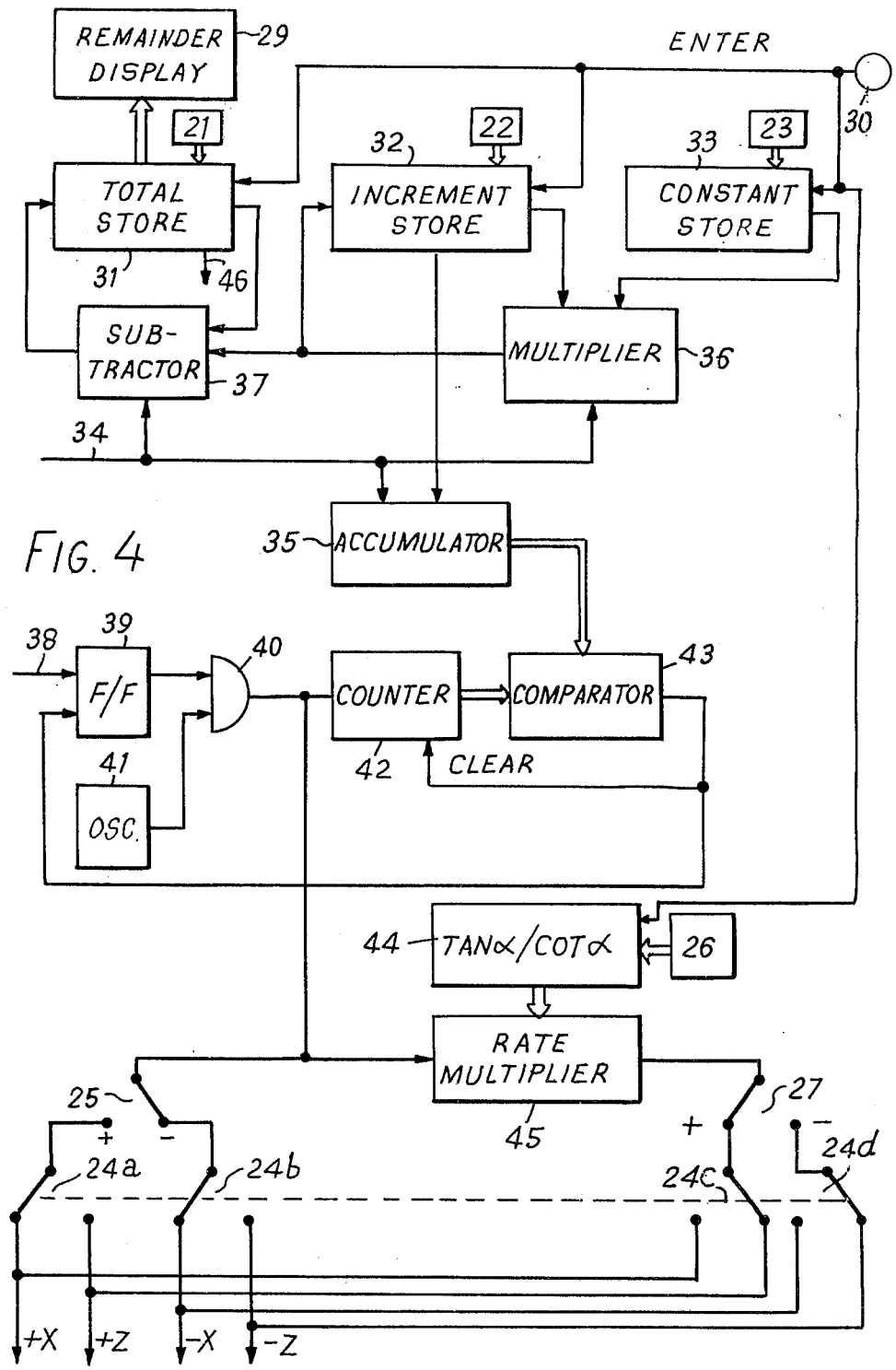
FIG. 4 shows the main elements of the device in simplified block form.

FIG. 4 shows digital stores 31, 32 and 33 in which the total, increment and constant respectively are entered, using conventional techniques, when the button 30 is depressed, from switches 21, 22 and 23 respectively. The movements 12–15 of the slides (FIG. 1) are controlled in a manner known per se in response to limit switches, one of which provides a signal on a line 34 at a convenient point in the cycle, say at the end of the machining pass 12. This signal causes the contents of the increment store 32 to be added into an accumulator 35 storing cumulative feed and also initiates a computing cycle in which the contents of the store 32 are multiplied in a digital multiplier 36 by the constant in the store 33, the product being written back in the store 32 as the new increment. The product is also subtracted by a subtractor 37 from the contents of the store 31 so that the total feed is reduced by the new increment, showing the remainder on the display 29.

Another limit switch on the machine provides a signal on line 38 at the end of the return traverse 14, signalling the need for a fresh in-feed. This signal sets a bistable flip-flop 39 which opens a gate 40 passing pulses from an oscillator 41 to a counter 42. The counter counts until a comparator 43 indicates equality with the contents of the accumulator 35, whereupon a pulse from the comparator resets the flip-flop 39 to close the gate 40, and also clears the counter 42.

The pulses from the gate 40 are also used as feed pulses for a stepping motor, being routed by the switch 25 and then by poles 24a and 24b of the switch 24 to one of four outputs labelled + X, − X, + Z and − Z for effecting drive on the axis selected by switch 24 and in the direction selected by switch 25.

When simultaneous drive is required on both axes, the value of tan α or cot α set on switches 26 is entered in a store 44. For α ≤ 45°, switch 24 is set to X and tan α is entered. For α > 45°, switch 25 is set to Z and cot α is entered. For single axis feed, the switches 26 are set to zero. The quantity in the store 44 controls a rate multiplier 45 which multiplies the pulse rate from the gate 40 by the value (always ≤1) of tan α or cot α and these pulses are routed to one of the outputs + X, − X, + Z, − Z by the sign switch 27 associated with the switches 26 and further poles 24c and 24d of the switch 24. The switches are shown set for − X and + Z drive as would be the case in machining the flank J, D, K in FIG. 2.

If desired, the panel of FIG. 3 can have duplicate switches for entering the parameters required for more than one machining stage, as needed for FIG. 2, so that the stages follow each other automatically. Each stage can be terminated automatically when a STOP signal on line 46 indicates that the total store 31 has been reduced to zero. Means (not shown) can then count off the number of passes set on the switch 28 to effect "spark-out" without any further feed increments.

Hobs may be single start or multi-start. As so far described, the device controls a single start operation with a switch 47 (FIG. 3) set accordingly to SS. The different starts can all be machined in turn by the process described with the required pitch displacements in between. These are effected by interrupting the gearing between the spindle of the lathe and the lead screw of the saddle and rotating the spindle or lead screw by the required amount. Because of "wind-up" in the gearing, the rotation is preferably measured by a resolver coupled to an element immediately adjacent the point where the coupling is broken, e.g. by an electromagnetic clutch.

Alternatively, it may be desired to machine the first increment on all starts, the second increment on all starts, and so on. In this case, the switch 47 is set to MS = multi-start and the number of starts is set on a decade switch 48. The device then only changes the increment (and cumulative feed) after a number of passes equal to the number of starts. The control of the lathe itself is set to effect the required pitch displacement following each pass by automatically disengaging the electromagnetic clutch and rotating the spindle or lead screw by the required amount.

When used for a relieving lathe, the joint X and Z drive facility is required. The apparatus can also control the subsequent grinding, in which case only X feed is required (with the superimposed cam-controlled relieving feed on another X-slide as in the turning). The foregoing references to spark-out cycles naturally apply to the grinding operation, not the turning operation.

Although the invention has been described particularly in relation to the control of feed increments in a grinding operation it will be appreciated that the device can be used to control any other machinery operations in which it is desired to establish a sequence of feed increments which reduce in magnitude in a progressive manner. Such operations may include timing operations, milling operations, shaping operations, and so on.

I claim:

1. In a machine tool control system of the type wherein repeated machining passes are effected with progressively reducing increments of in-feed, the improvement comprising means for storing the current feed increment, means for storing a modifying constant, and computing means operative to form a predetermined mathematical combination of the stored feed increment and modifying constant such as to form a new, smaller feed increment, and to replace the stored current feed increment by the new feed increment to form the current feed increment for a successive machining pass.

2. The invention of claim 1, wherein the stored modifying constant is less than unity and the computing arrangement comprises a multiplier for multiplying the stored feed increment by the modifying constant to form the new feed increment.

3. The invention of claim 1, further comprising a total feed store and means for decrementing the total feed store by each new feed increment.

4. The invention according to claim 1, further comprising a pulse generator circuit for generating a number of feed pulses corresponding to each feed increment.

5. The invention according to claim 4, further comprising a pulse rate multiplier multiplying the rate of the feed pulses by a selected factor to provide feed pulses for a second machine axis.

* * * * *